United States Patent
Bares et al.

(10) Patent No.: US 9,219,784 B2
(45) Date of Patent: Dec. 22, 2015

(54) SYNCHRONIZATION OF A SERVER SIDE DEDUPLICATION CACHE WITH A CLIENT SIDE DEDUPLICATION CACHE

(71) Applicant: International Business Machines Corporation, Armonk, NY (US)

(72) Inventors: Jeremy M. Bares, Tucson, AZ (US); Robert G. Genis, Jr., Tucson, AZ (US); Howard N. Martin, Tucson, AZ (US); Diem T. Nguyen, Tucson, AZ (US); Michael G. Sisco, Vail, CO (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 13/789,540

(22) Filed: Mar. 7, 2013

(65) Prior Publication Data

US 2014/0258370 A1  Sep. 11, 2014

(51) Int. Cl.
  *G06F 15/16* (2006.01)
  *H04L 29/08* (2006.01)
  *G06F 3/06* (2006.01)
  *G06F 17/30* (2006.01)
  *G06F 11/00* (2006.01)

(52) U.S. Cl.
  CPC .......... *H04L 67/1095* (2013.01); *G06F 3/0641* (2013.01); *G06F 11/00* (2013.01); *G06F 17/30* (2013.01); *G06F 17/30156* (2013.01); *G06F 17/30159* (2013.01); *H04L 67/2842* (2013.01)

(58) Field of Classification Search
  CPC ..................................................... G06F 3/0641
  USPC ........................................................ 709/203
  See application file for complete search history.

(56) References Cited

U.S. PATENT DOCUMENTS

| 8,166,261 | B1 | 4/2012 | Cremelie et al. | |
| 8,214,428 | B1 | 7/2012 | Christiaens | |
| 2004/0205299 | A1* | 10/2004 | Bearden | 711/137 |
| 2006/0230013 | A1* | 10/2006 | Hrle et al. | 707/1 |
| 2010/0094817 | A1* | 4/2010 | Ben-Shaul et al. | 707/697 |
| 2010/0250858 | A1* | 9/2010 | Cremelie et al. | 711/136 |
| 2014/0101113 | A1* | 4/2014 | Zhang et al. | 707/692 |
| 2014/0188805 | A1* | 7/2014 | Vijayan | 707/646 |

* cited by examiner

*Primary Examiner* — Jason Recek
(74) *Attorney, Agent, or Firm* — Rabindranath Dutta; Konrad, Raynes, Davda and Victor LLP

(57) ABSTRACT

A server computational device maintains commonly occurring duplicate chunks of deduplicated data that have already been stored in a server side repository via one or more client computational devices. The server computational device provides a client computational device with selected elements of the commonly occurring duplicate chunks of deduplicated data, in response to receiving a request by the server computational device from the client computational device to prepopulate, refresh or update a client side deduplication cache maintained in the client computational device.

20 Claims, 9 Drawing Sheets

SYNCHRONIZATION OF A SERVER SIDE DEDUPLICATION CACHE WITH A CLIENT SIDE DEDUPLICATION CACHE

BACKGROUND

1. Field

The disclosure relates to a method, system, and article of manufacture for the synchronization of a server side deduplication cache with a client side deduplication cache.

2. Background

Data deduplication which is also known as single instance store or data folding refers to the process of eliminating or significantly reducing multiple copies of the same data. For example, data deduplication may eliminate duplicate files in a storage system or may remove duplicate portions of a single file. Certain exemplary data deduplication mechanisms may offer the promise of a twenty fold reduction of stored data, by identifying repetitive storage of identical data and eliminating all but one copy of the identical data.

Data deduplication mechanisms may be used to reduce the amount of storage space that is needed for storing data. Client-server based backup applications may use data deduplication to reduce the storage space needed to maintain backup data in the server.

SUMMARY OF THE PREFERRED EMBODIMENTS

Provided are a method, a system, and a computer program product in which server computational device maintains commonly occurring duplicate, chunks of deduplicated data that have already been stored in a server side repository via one or more client computational devices. The server computational device provides a client computational device with selected elements of the commonly occurring duplicate chunks of deduplicated data, in response to receiving a request by the server computational device from the client computational device to prepopulate, refresh or update a client side &dupli­cation cache maintained in the client computational device.

In additional embodiments, the server computational device maintains information about reference counts of the chunks. The server computational device also maintains information about dates and times when the chunks were stored in the server side repository. Additionally, the server computational device further maintains information about what type of data the chunks represent and whether the chunks are based on a single client system, a group of similar client systems, or comprise an entire catalog of unique chunks.

In yet additional embodiments, a request is received to prepopulate the client side deduplication cache. In response to determining that a priming client corresponding the client computational device exists, the client computational device is sent information on chunks stored by the priming client, to prepopulate the client side deduplication cache. In response to determining that a priming client corresponding the client computational device does not exist, the client computational device is sent information on chunks stored by the client computational device in a previous backup to the server computational device by the client computational device.

In certain embodiments, a request is received to refresh the client side deduplication cache that is invalid. In response to determining that the client computational device has stored chunks on the server computational device in a previous backup, the client computational device is sent information on the chunks stored by the client computational device in the previous backup. In response to determining that the client computational device has not stored chunks on the server computational device in a previous backup, the client computational device is sent information on the chunks stored by a priming client corresponding to the client computational device.

In further embodiments, the server computational device provides information to the client computational device that potentially increases a cache hit ratio of the client side deduplication cache in the client computational device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain embodiments a client maintains a client side cache that stores chunks of deduplicated data that are frequently accessed by the client. The server maintains a catalog that stores commonly used chunks of duplicated data for a plurality of clients. The client periodically backs up chunks of deduplicated data to the server. The server periodically prepopulates, refreshes or updates the client side cache. As a result, the client side cache used more efficiently and the time spent in transferring chunks between the client and the server is reduced.

Embodiments

Figure 1:
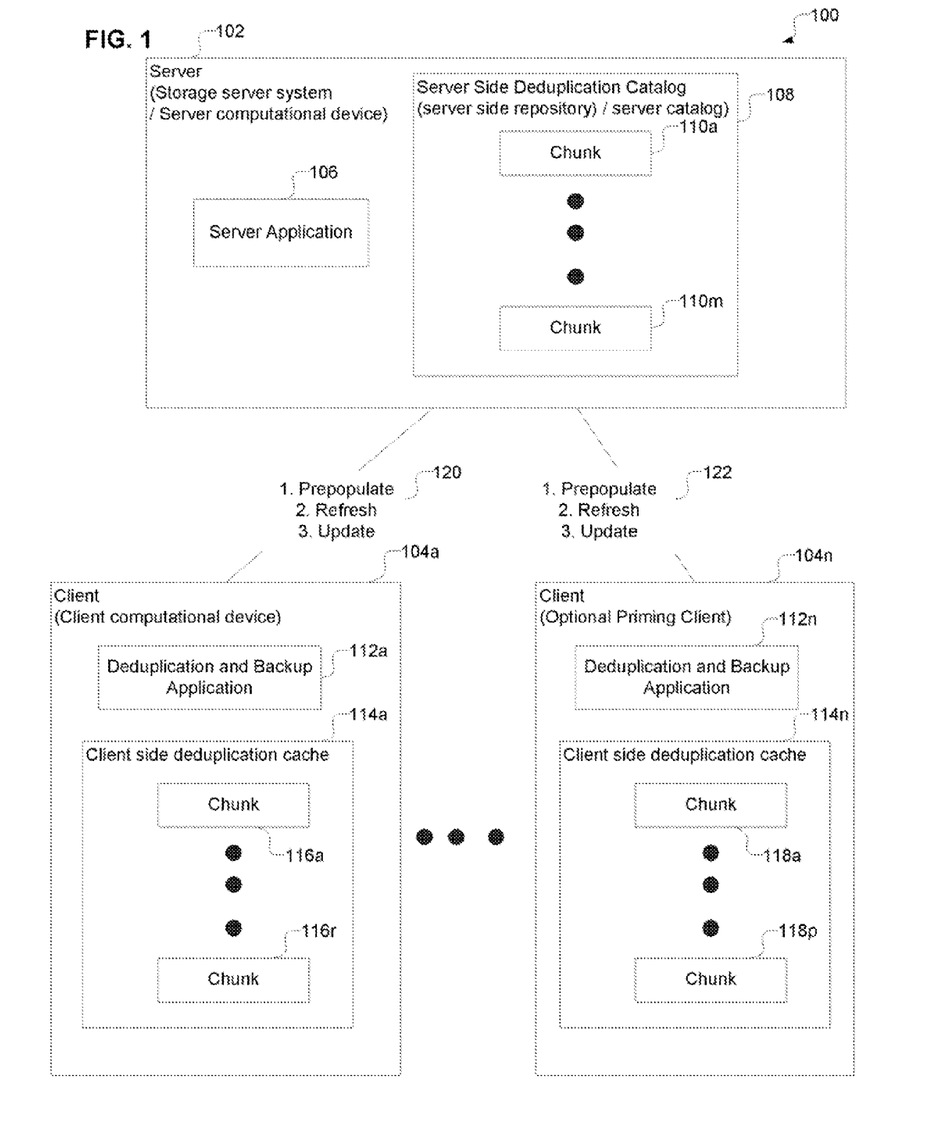
FIG. 1 illustrates a block diagram of a computing environment that includes a server computational device coupled to one or more client computational devices, in accordance with certain embodiments.

FIG. 1 illustrates a block diagram of a computing environment 100 that includes a server computational device 102 coupled to one or more client computational devices 104a . . . 104n, in accordance with certain embodiments.

The server computational device 102 and the client computational devices 104a . . . 104n may comprise any suitable computational device including those presently known in the art such as, a personal computer, a workstation, a server, a mainframe, a hand held computer, a palm top computer, a telephony device, a network appliance, a blade computer, a server, etc. In certain embodiments, the server computational device 102 and the client computational devices 104a . . . 104n may be coupled via a network, such as the Internet, an intranet, a storage area network, a local area network, etc.

The server computational device 104 includes a server application 104 and a server side deduplication catalog 108. The server application 104 manages the server side deduplication catalog 104 and controls communications exchanged with the client computational devices 104a . . . 104n.

The server side deduplication catalog 108 is also referred to as a server side repository or a server catalog. In certain embodiments, the server side deduplication catalog 108 stores a plurality of chunks 110a . . . 110m where the chunks correspond to portions of files or other data storage structure. In certain embodiments, a chunk stored in the server side deduplication catalog 108 may be accessed and used by a plurality of client computational devices 104a . . . 104n. In certain embodiments, instead of chunks 110a . . . 110m, pointers to locations of chunks may be stored in the server side deduplication catalog 108, and the pointers may be used to access the chunks stored in the server computational device 102. The chunks stored in the server computational device 102 may include chunks that have been backed up in the server computational device 102 by the client computational devices 104a . . . 104n.

Each of the client computational devices 104a . . . 104n includes a deduplication and backup application (e.g., 112a . . . 112n) and a client side deduplication cache (e.g., 114a . . . 140n). The client side deduplication caches 114a . . . 114n may store chunks of deduplicated data 116a . . . 116r, 118a . . . 118p, as shown in FIG. 1.

The deduplication and backup applications 112a . . . 112n may perform deduplication of data in the client computational devices 104a . . . 104n and also backup some or all of the deduplicated data to the server computational device 102.

The server application 106 may interact with the deduplication and backup application to prepopulate, refresh and update the client side deduplication cache 114a . . . 114n as shown via reference numerals 120 and 122.

Therefore, FIG. 1 illustrates certain embodiments in which a server application 106 prepopulates refreshes, and updates one or more of a plurality of client side deduplication caches 114a . . . 114n.

Figure 2:
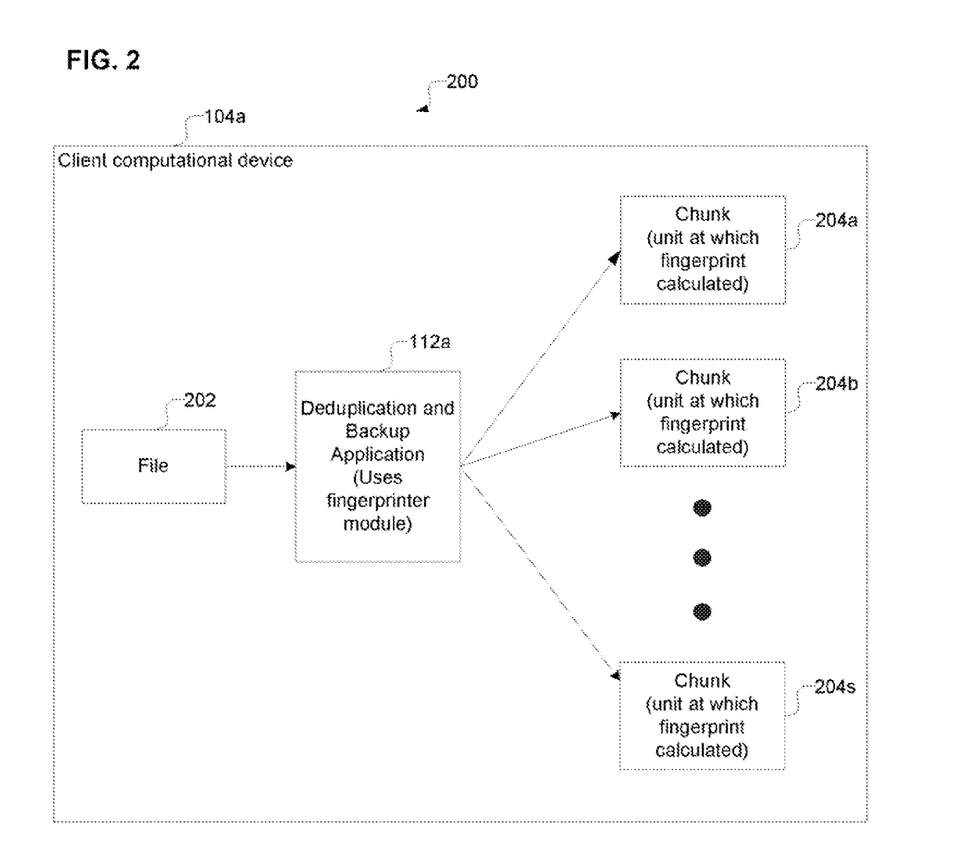
FIG. 2 illustrates a block diagram that shows operations performed by a deduplication and backup application in the client computational device, in accordance with certain embodiments.

FIG. 2 illustrates a block diagram 200 that shows operations performed by a deduplication and backup application 112a in the client computational device 104a, in accordance with certain embodiments.

The deduplication and backup application 112a may divide a file (or alternatively some other type of storage data structure) into a plurality of chunks 204a, 204b, . . . 204s, and compute fingerprints for each chunk of the plurality of chunks 204a, 204b, . . . 204s. The fingerprint of each chunk is unique and may be used to identify the chunk. During a process of deduplication and backup, if a chunk already exists then a second copy of the chunk is not stored and a pointer may be maintained to the already existing chunk.

Figure 3:
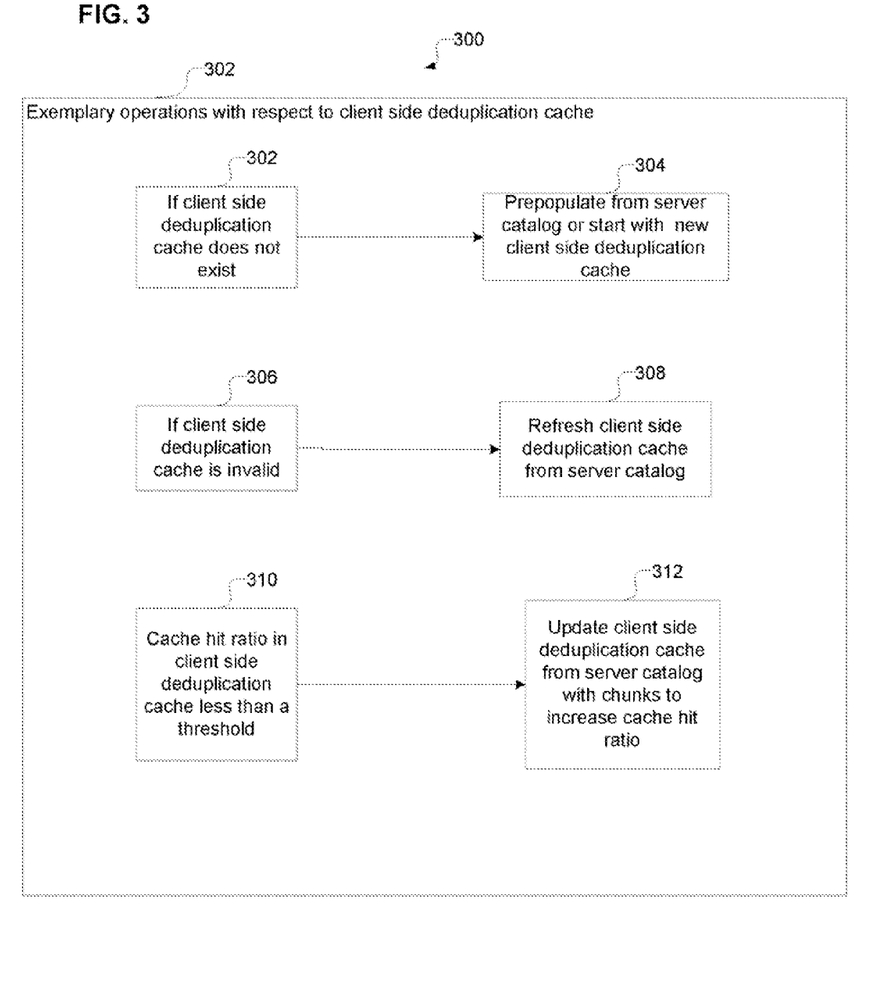
FIG. 3 illustrates a block diagram that shows operations performed with respect to a client side deduplication cache, in accordance with certain embodiments.

FIG. 3 illustrates a block diagram 300 that shows operations performed with respect to a client side deduplication cache (as shown via reference numeral 302), in accordance with certain embodiments.

In certain embodiments shown via reference numerals 302, 304, if a client side deduplication cache 114a does not exist, then a new client side deduplication may be created and prepopulated with selected chunks from the server side deduplication catalog 108.

In certain additional embodiments shown via reference numeral 306, 308, if a determination is made that a client side deduplication 114a cache is invalid (i.e., the contents of the client side deduplication cache are erroneous), then the client side deduplication cache is refreshed from the server side deduplication catalog 108 with selected chunks indicated by the server side deduplication catalog 108.

In yet additional embodiments shown via reference numerals 310, 312, if the cache hit ratio in the client side deduplication cache 310 is less than a threshold, then the client side deduplication cache 114a is updated with selected chunks from the server side deduplication catalog 108, to increase cache hit ratio. When the cache hit ratio in the client side deduplication cache 114a is less than the threshold, a determination may be made that the client side deduplication cache 114a is not being used efficiently (i.e., the chunks stored in the client side deduplication cache 114a are probably not the ones that are being accessed frequently by the client computational device 104a). Therefore, it may be desirable to update the client side deduplication cache 114a with chunks retrieved from the server side deduplication catalog 108.

Figure 4:
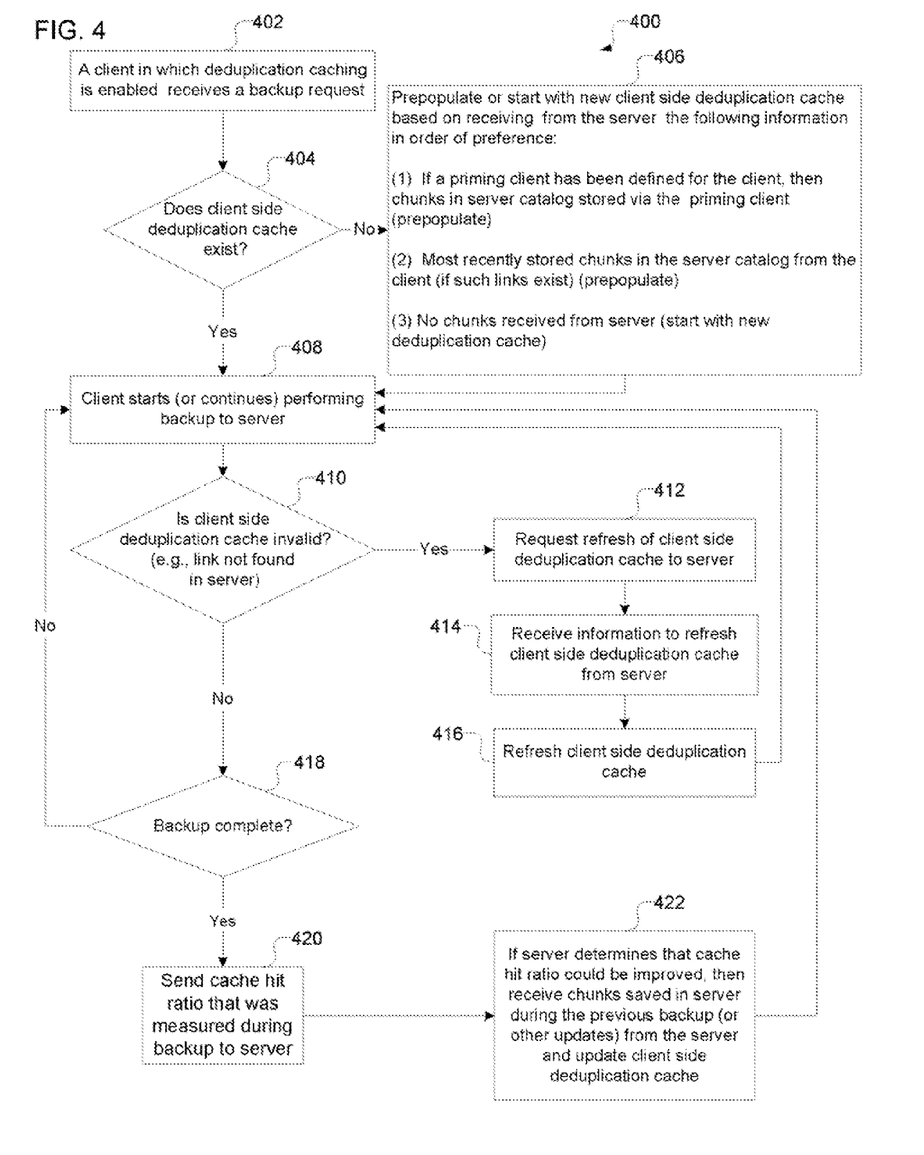
FIG. 4 illustrates a first flowchart that shows operations performed by a client computational device, in accordance with certain embodiments.

FIG. 4 illustrates a first flowchart 400 that shows operations performed at least by deduplication and backup application 112a of the a client computational device 104a, in accordance with certain embodiments.

Control starts at block 402, in which a client computational device 104a in which deduplication caching is enabled, receives a backup request. A determination is made at block 404 as to whether a client side deduplication cache exists in the client computational device 104a. If not ("no" branch from block 404), the client side deduplication cache is prepopulated with chunks received from the server, or a new client side deduplication cache is generated (at block 406), by performing operations in the following order:

(1) If a priming client 104n has been defined for the client, then chunks in the server side deduplication catalog 108 are stored via the priming client 104n. The priming client 104n may comprise a client computational device that is operationally similar to the client computational device 104a, and therefore may have a significant number of chunks that are similar to chunks used by the client computational device 104a. In certain embodiments, the priming client 104n and the client computational device 104a may be configured with the same version of an operating system and may be executing many similar applications;

(2) Most recently stored chunks in the server side deduplication catalog 108 from the client computational device 104a are retrieved, if links to such most recently stored chunks exist. This may be referred to as prepopulation of the client side deduplication cache; and (3) If no chunks are received from the server computational device 104, then the client computational device 104a starts with a new deduplication cache.

If a determination is made (at block 404) that the client side deduplication cache 114a exists ("yes" branch from block 404), then the client computational device 104a starts or continues performing (at block 408) backups to the server computational device 102. Control proceeds to block 410 in which a determination is made as to whether the client side deduplication cache is invalid, i.e., links are not found in the server computational device 102 to chunks of the client side deduplication cache. If so (i.e., the client side deduplication cache is invalid), then control proceeds to block 412 in which the deduplication and backup application 112a requests a refresh of the client side deduplication cache to the server application 106 of the server computational device 102, and receives (at block 414) information to refresh the client side deduplication cache from the server application 106 of the server computational device 102. On receiving the information, the deduplication and backup application 112a refreshes (at block 416) the client side deduplication cache.

If at block 410 a determination is made that the client side deduplication cache is valid ("No" branch from block 410), then a determination is made as to whether backup of chunks to the server computational device 102 is complete (at block 418). If so, the deduplication and backup application 112a sends (at block 420) a cache hit ratio of the client side &duplication cache 114a that was measured during the performing of the backup to the server computational device.

If the server computational device 102 determines (at block 422) that it is possible to improve the cache hit ratio of the client side deduplication cache 114a, then the client computational device 104a receives chunks saved in the server computational device 102 during a previous backup and/or other updates from the server computational device 102, and updates the client side deduplication cache 114a. Control returns from blocks 406, 416, 422 to block 408 and the client computational device 104a continues to perform backups to the server computational device 102. If at block 418, a determination is made that the backup is not complete, control returns to block 408, and the client computational device 104a continues to perform backups to the server computational device 102.

Therefore, FIG. 4 illustrates certain embodiments in which the client side deduplication cache 114a of the client side computational device 104a is prepopulated, refreshed, or updated from the server side deduplication catalog 108.

Figure 5:
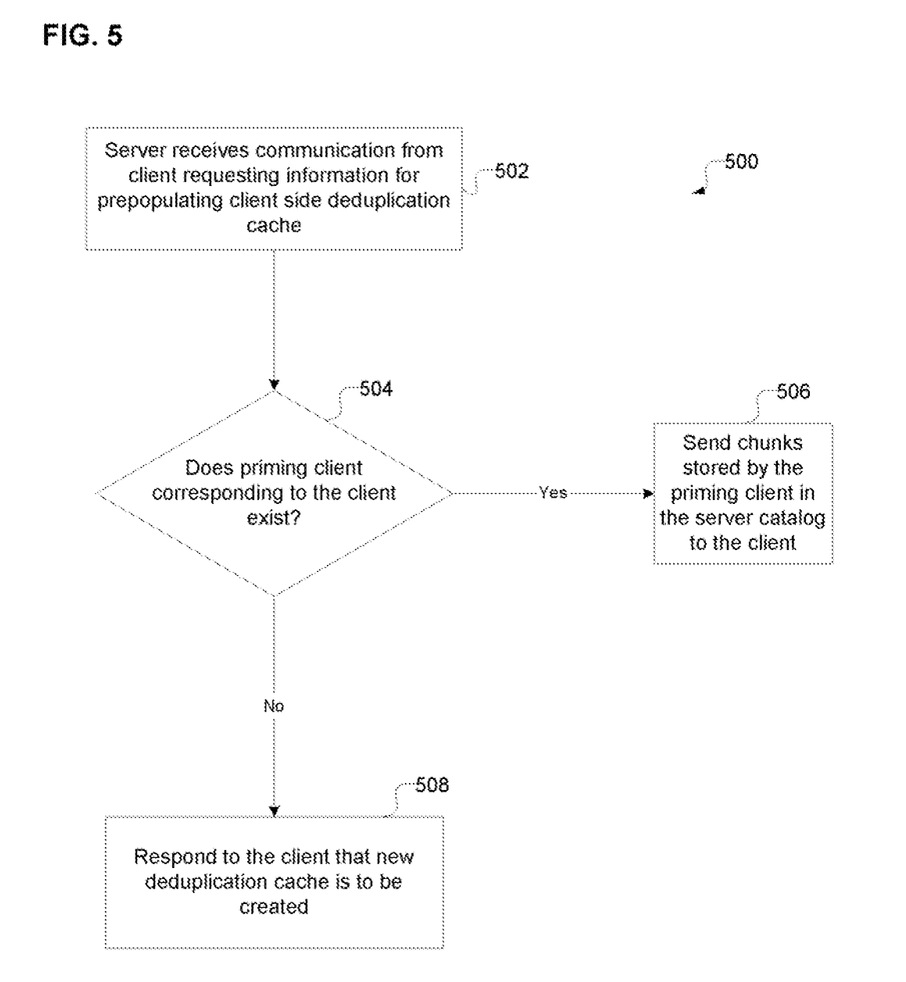
FIG. 5 illustrates a second flowchart that shows operations performed by a server computational device, in accordance with certain embodiments.

FIG. 5 illustrates a second flowchart 500 that shows operations performed by the server application 106 of the server computational device 102, in accordance with certain embodiments.

Control starts at block 502 in which the server computational device 102 receives a communication from the client computational device 104a, where the communication requests information for prepopulating the client side deduplication cache 114a.

A determination is made (at block 504) as to whether a priming client 104n corresponding to the client computational device 104a exists. If so ("yes" branch from block 504), the server computational device 102 sends (at block 506) chunks stored by the priming client 104n in the server computational device 102 catalog are sent to the client computational device 104a. If not, the server computational device 102 responds (at block 508) to the client computational device 104a that a new client side deduplication cache is to be created.

Figure 6:
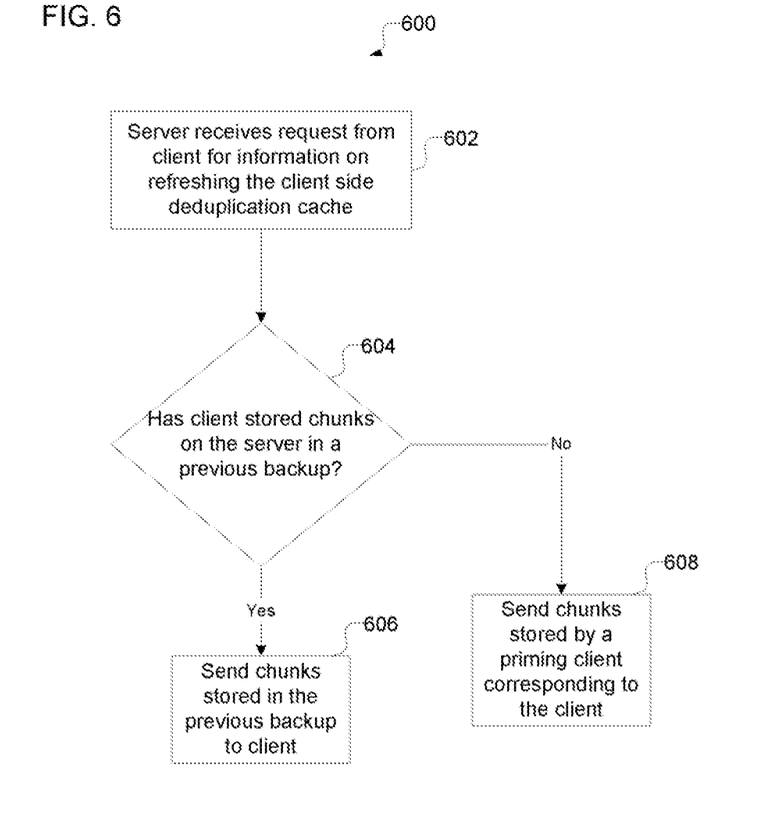
FIG. 6 illustrates a third flowchart that shows operations performed by a server computational device, in accordance with certain embodiments.

FIG. 6 illustrates a third flowchart 600 that shows operations performed by the server application 106 of the server computational device 102, in accordance with certain embodiments.

Control starts at block 600 where the server computational device 102 receives a request from the client computational device 104a for information on refreshing the client side deduplication cache 114a. The server application 106 determines (at block 604) whether the client computational device 104a has stored chunks on the server computational device 102 in a previous backup. If so, then the server application 106 sends chunks stored in the previous backup in the server side deduplication catalog 108, to the client computational device 104a.

If the server application 106 determines (at block 604) that the client computational device 104a has not stored chunks on the server computational device 102, then the server application 106 sends (at block 608) chunks stored by a priming client 104n to the client computational device 104a.

Figure 7:
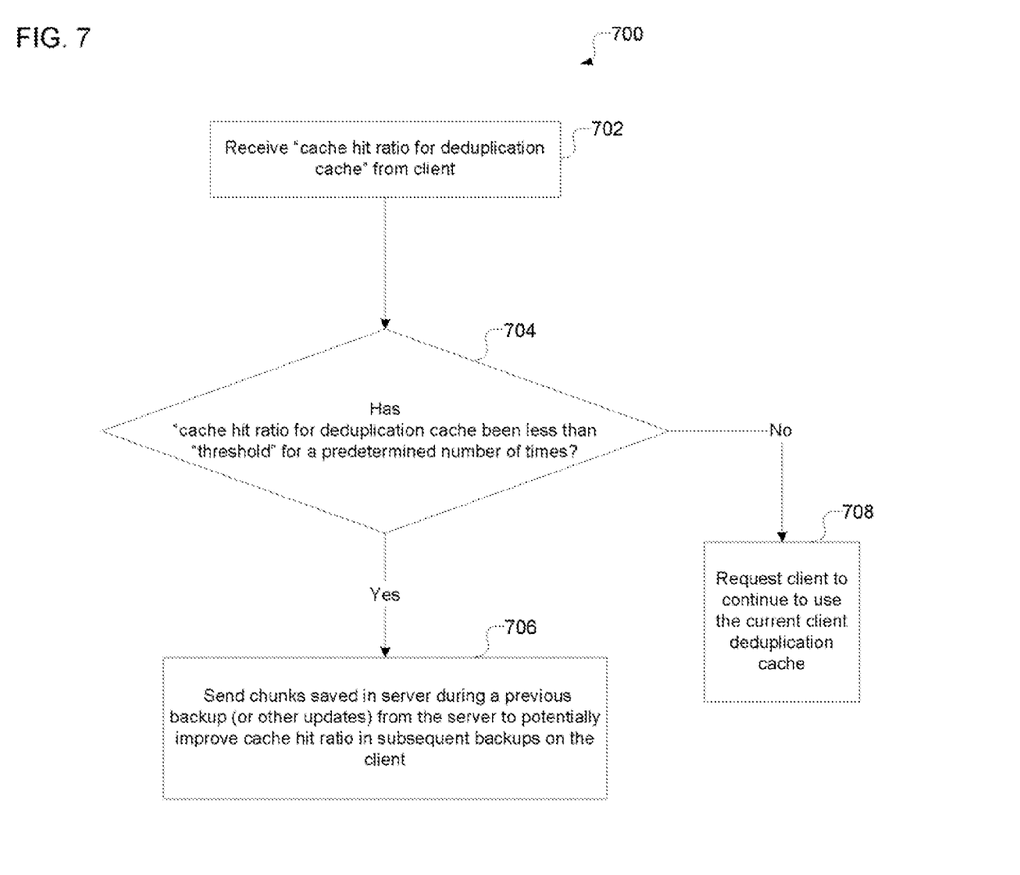
FIG. 7 illustrates a fourth flowchart that shows operations performed by a server computational device, in accordance with certain embodiments.

FIG. 7 illustrates a fourth flowchart that shows operations performed by the server application 106 of the server computational device 102, in accordance with certain embodiments.

Control starts at block 702, in which the server application 106 receives a cache hit ratio for the client side deduplication cache 114a from the client computational device 104a. A determination is made at block 704 as to whether the cache hit ratio for the client side deduplication cache has been less than a "threshold" for a predetermined number of times. If so ("yes" branch from block 704), then the server application 106 sends (at block 706) chunks saved in the server computational device 102 during a previous backup to the client computational device 104a, to potentially improve the cache hit ratio in subsequent backups performed on the client computational device 104a.

If at block 704, a determination is that the cache hit ratio for the client side deduplication cache been not been less than "threshold" for a predetermined number of times, then the server application 106 requests the client computational device 104a to continue to use the current client side deduplication cache.

Figure 8:
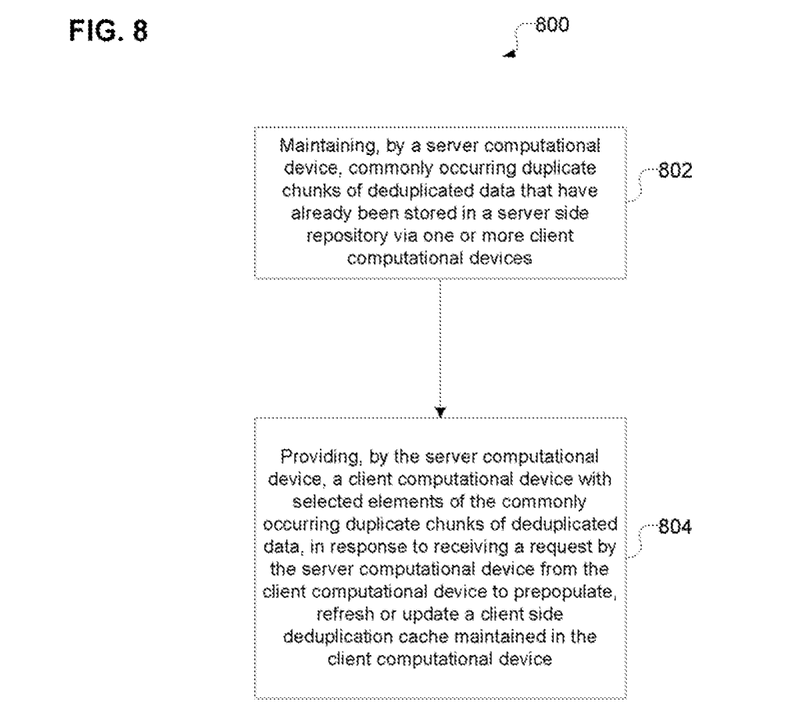
FIG. 8 illustrates a fifth flowchart that shows operations performed by a server computational device, in accordance with certain embodiments.

FIG. 8 illustrates a fifth flowchart that shows operations performed by a server computational device, in accordance with certain embodiments.

Control starts at block 802 where a server computational device 102 maintains commonly occurring duplicate chunks of deduplicated data that have already been stored in a server side repository 108 via one or more client computational devices 104a . . . 104n. The server computational device 102 provides (at block 804) a client computational device 104a with selected elements of the commonly occurring duplicate chunks of deduplicated data, in response to receiving a request from the client computational device 104a to prepopulate, refresh or update a client side deduplication cache 114a maintained in the client computational device 104a.

In additional embodiments, the server computational device 102 maintains information about reference counts of the chunks, where the reference counts indicate how frequently the chunks have been used. The server computational device 102 also maintains information about dates and times when the chunks were stored in the server side repository 108. Additionally, the server computational device 102 further maintains information about what type of data the chunks represent and whether the chunks are based on a single client system, a group of similar client systems, or comprise an entire catalog of unique chunks. The information maintained in the server is used to prepopulate, refresh, or update the client side deduplication cache 114a.

Therefore, FIGS. 1-8 illustrate certain embodiments in which a server computational device prepopulates, refreshes, or updates a client side deduplication cache maintained in a client computational device to reduce the number of chunks that have to be moved back and forth between the client computational device 104a and server computational device 102.

Further Embodiments

In certain embodiments, the server may provide the client with a list of commonly occurring chunks that have already been stored within the server catalog. The server may use reference counts of chunks, dates when chunks were linked in the server catalog, and information about the type of data the chunks represent, to reduce the number of look-ups a client system performs against the server. Populating the client cache based on the server catalog may increase the likelihood of a cache hit to further reduce the overhead of communications.

Certain embodiments provide the ability to track reference counts for all duplicate fingerprints in the server deduplication catalog system and to track them by reference date such that trends may be established. In addition, all client systems may be controlled such that the server system may determine deduplication patterns specific to each client systems. The implementation in certain embodiments may be as follows:

The client system may be defined on the server system as a deduplication enabled client with one of the following fingerprint cache sources. For example:
1) Specific Client System Name: This source type may cause the server system to use a single client system to populate duplicate fingerprint hits. Client systems containing similar data (for example, database applications) may be a typical use case for such embodiments;
2) Specific Client System Domain or Cluster: This source type may cause the server system to use a range of similar client system to populate duplicate fingerprint hits. A group of systems containing similar data (for example, Windows client systems with common system files) may be a typical use for such embodiments; and
3) All Client Systems with Deduplicated Data in Server Catalog: This source type may not limit the server system in its selection of duplicate fingerprint hits. If the client system has a high change rate, the existing duplicate fingerprints on the server may provide a better cache for the client.

The client system may also have an attribute defined to allow for the server system to know if the Client-Side Deduplication Cache may be generated by the server system in the following, manner:
- At the very first backup from client system (via priming);
- After a time-lapse between backups from client machine (periodic refresh);
- After a cache hit ratio alert has been triggered (dynamic refresh);
- Always reinitializing using server-side fingerprint generation (constant refresh): and
- On demand from the client system.

Once the client system has been defined, and configured on the server system, the embodiments for fingerprint look-ups in the server system catalog may leverage the following in the server system deduplication engine:
- The reference counts for all chunks in the catalog on server system;
- A timestamp for the reference count tracker such that all updates are noted by date;
- A correlation between the reference counts by client system; and
- A grouping system such that client systems can be identified by cluster or group.

If the above constructs are available in the server system deduplication engine, the server system may access and provide the fingerprint values to the client based on criteria set in the client system definition. For instance, the following may occur for each fingerprint cache source:

1) Specific Client System Name: The server may query the entire catalog using the client system id defined. The duplicate fingerprint values may be ordered by highest reference count based on dates (all, daily, weekly, monthly, etc.) of duplicate signature hits. The client system may then be sent these values to fit the client-side deduplication cache size.
2) Specific Client System Domain or Cluster: The server may query the entire catalog using the group/cluster name provided in the client system definition. The group/cluster id may be used to filter results. The fingerprint values may be ordered by highest reference count based on dates of duplicate signature hits. The client system may then be sent these values to fit the client-side deduplication cache size.
3) All Client Systems that have deduplicated data in the server catalog: The server may query the entire catalog and order the result set by highest reference count based dates of duplicate signature hits. The client system may then be sent these values to fit client-side deduplication cache size.

The resulting values from the server system catalog may be limited to the size of the cache provided by client system. For instance, if the client cache size is 1 GB, the amount of results required to fill that cache may be known by the server system and the query modified to only return items that may fit into the cache. Additional flexibility may be built in such that the server system may fill a percentage of the available cache and leave the remaining cache for the client system to fill as new duplicate fingerprint chunks are identified.

The client may also control the refresh by alerting the server prior to the backup that a refresh is required. The client alert may be managed via a cache hit ratio trigger. This may be preferable if the client-side deduplication cache is out of synchronization with server system or if the current cache yields very few duplicate hits.

The following scenario may be one example for certain embodiments. Client system A is newly added and configured to store data to the server system. The client system may utilize client-side deduplication such that minimal amount of data is sent to the server system. The server system already has a deduplication fingerprint catalog that has been built with backed up data from other client systems in the environment. The embodiments described above may be implemented to prime, the client machine with a deduplication cache using a controllable source, and replacement option on the server system.

Once the client-side deduplication cache replacement parameters have been set, the client machine may engage the server system to retrieve the desired fingerprint values to fill the deduplication cache. The deduplication cache size may be dictated by the client system. The fingerprint retrieval mechanism may be dependent on the fingerprint source chosen, but the retrieval mechanism may use the reference count of fingerprint chunks to provide a greater chance of duplicate hits on the client deduplication cache.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be, transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable: data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
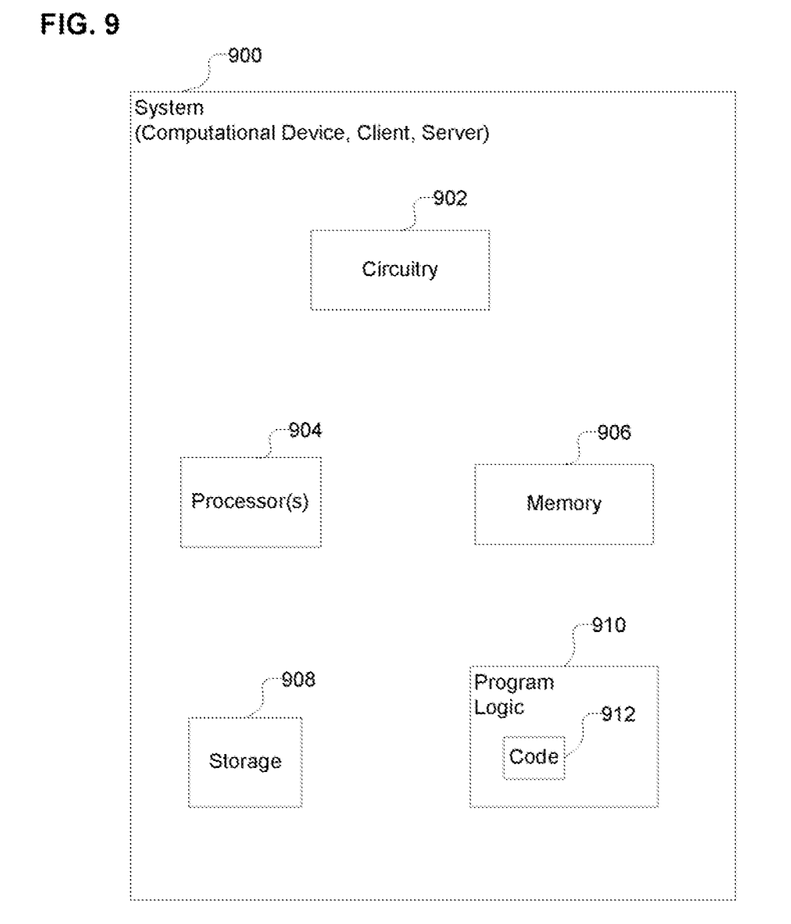
FIG. 9 illustrates a block diagram of a computational system that shows certain elements that may be included in at least the client computational device and the server computational device of FIG. 1, in accordance with certain embodiments.

FIG. 9 illustrates a block diagram that shows certain elements that may be included in the client computational devices $104a \ldots 104n$, and the server computational device 102, in accordance with certain embodiments. The system 900 may comprise the storage controller 102 and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments" "one or more embodiments", "some embodiments", and "one embodiment." mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for communicating with one or more client computational devices, comprising,
   maintaining, by a server computational device, commonly occurring duplicate chunks of deduplicated data that have already been stored in a server side repository via the one or more client computational devices, and
   providing, by the server computational device, a client computational device with selected elements of the commonly occurring duplicate chunks of deduplicated data, in response to receiving a request by the server computational device from the client computational device to prepopulate, refresh or update a client side deduplication cache maintained in the client computational device, the method further comprising:
   receiving, by the server computational device, a request to prepopulate the client side deduplication cache of the client computational device:
   determining, by the server computational device, whether a priming client corresponding the client computational device exists, wherein the priming client and the client computational device both have a same version of an operating system, and wherein the priming client and the client computational device are both configured to be provided by the server computational device with elements selected from the commonly occurring duplicate chunks of deduplicated data;
   in response to determining that a priming client corresponding to the client computational device exists, sending, the client computational device, information on chunks stored by the priming client to prepopulate the client side deduplication cache; and
   in response to determining that a priming client corresponding to the client computational device does not exist, sending the client computational device, information on chunks stored by the client computational device in a previous backup to the server computational device by the client computational device.

2. The method of claim 1, wherein the server computational device further performs:
   maintaining information about reference counts of the chunks;
   maintaining information about dates and times when the chunks were stored in the server side repository; and
   maintaining information about type of data the chunks represent and whether the chunks are based on a single client system, a group of similar client systems, or comprise an entire catalog of unique chunks.

3. The method of claim 1, the method further comprising:
   receiving a request to refresh the client side deduplication cache that is invalid;
   in response to determining that the client computational device has stored chunks on the server computational device in a previous backup, sending the client computational device, information on the chunks stored by the client computational device in the previous backup; and
   in response to determining that the client computational device has not stored chunks on the server computational device in a previous backup, sending the client computational device, information on the chunks stored by a priming client corresponding to the client computational device.

4. The method of claim 1, wherein the server computational device provides information to the client computational device that potentially increases a cache hit ratio of the client side deduplication cache in the client computational device.

5. The method of claim 1, wherein the server computational device updates the client side deduplication cache from a server catalog with chunks to increase cache hit ratio, in response to the cache hit ratio in the client side deduplication cache being less than a threshold.

6. A system coupled to one or more client computational devices, the system comprising:
   a memory; and
   a processor coupled to the memory, wherein the processor performs operations, the operations comprising:
   maintaining, commonly occurring duplicate chunks of deduplicated data that have already been stored in a server side repository via the one or more client computational devices; and providing a client computational device of the one or more client computational devices, with selected elements of the commonly occurring duplicate chunks of deduplicated data, in response to receiving a request from the client computational device to prepopulate, refresh or update a client side deduplication cache maintained in the client computational device, wherein the system is a server computational device, the operations further comprising:

receiving, by the server computational device, a request to prepopulate the client side deduplication cache of the client computational device;

determining, by the server computational device, whether a priming client corresponding the client computational device exists, wherein the priming client and the client computational device both have a same version of an operating system, and wherein the priming client and the client computational device are both configured to be provided by the server computational device with elements selected from the commonly occurring duplicate chunks of deduplicated data;

in response to determining that a priming client corresponding to the client computational device exists, sending, the client computational device, information on chunks stored by the priming client to prepopulate the client side deduplication cache; and in response to determining that a priming client corresponding to the client computational device does not exist, sending the client computational device, information on chunks stored by the client computational device in a previous backup to the server computational device by the client computational device.

7. The system of claim 6, the operations further comprising:

maintaining information about reference counts of the chunks;

maintaining information about dates and times when the chunks were stored in the server side repository; and maintaining information about type of data the chunks represent and whether the chunks are based on a single client system, a group of similar client systems, or comprise an entire catalog of unique chunks.

8. The system of claim 6, wherein the system in a server computational device, the operations further comprising:

receiving a request to refresh the client side deduplication cache that is invalid;

in response to determining that the client computational device has stored chunks on the server computational device in a previous backup, sending the client computational device, information on the chunks stored by the client computational device in the previous backup; and in response to determining that the client computational device has not stored chunks on the server computational device in a previous backup, sending the client computational device, information on the chunks stored by a priming client corresponding to the client computational device.

9. The system of claim 6, wherein the system provides information to the client computational device that potentially increases a cache hit ratio of the client side deduplication cache in the client computational device.

10. The system of claim 6, wherein the server computational device updates the client side deduplication cache from a server catalog with chunks to increase cache hit ratio, in response to the cache hit ratio in the client side deduplication cache being less than a threshold.

11. A computer program product, the computer program product comprising a non-transitory computer readable storage medium having computer readable program code embodied therewith, the computer readable program code configured to perform operations on a server computational device coupled to one or more client computational devices, the operations comprising:

maintaining, by the server computational device, commonly occurring duplicate chunks of deduplicated data that have already been stored in a server side repository via one or more client computational devices; and providing, by the server computational device, a client computational device of the one or more client computational devices, with selected elements of the commonly occurring duplicate chunks of deduplicated data, in response to receiving a request by the server computational device from the client computational device to prepopulate, refresh or update a client side deduplication cache maintained in the client computational device, the operations further comprising:

receiving, by the server computational device, a request to prepopulate the client side deduplication cache of the client computational device;

determining, by the server computational device, whether a priming client corresponding the client computational device exists, wherein the priming client and the client computational device both have a same version of an operating system, and wherein the priming client and the client computational device are both configured to be provided by the server computational device with elements selected from the commonly occurring duplicate chunks of deduplicated data;

in response to determining that a priming client corresponding to the client computational device exists, sending, the client computational device, information on chunks stored by the priming client to prepopulate the client side deduplication cache; and in response to determining that a priming client corresponding to the client computational device does not exist, sending the client computational device, information on chunks stored by the client computational device in a previous backup to the server computational device by the client computational device.

12. The computer program product of claim 11, the operations further comprising:

maintaining information about reference counts of the chunks;

maintaining information about dates and times when the chunks were stored in the server side repository; and maintaining information about type of data the chunks represent and whether the chunks are based on a single client system, a group of similar client systems, or comprise an entire catalog of unique chunks.

13. The computer program product of claim 11, the operations further comprising:

receiving a request to refresh the client side deduplication cache that is invalid;

in response to determining that the client computational device has stored chunks on the server computational device in a previous backup, sending the client computational device, information on the chunks stored by the client computational device in the previous backup; and in response to determining that the client computational device has not stored chunks on the server computational device in a previous backup, sending the client computational device, information on the chunks stored by a priming client corresponding to the client computational device.

14. The computer program product of claim 11, wherein the server computational device provides information to the client computational device that potentially increases a cache hit ratio of the client side deduplication cache in the client computational device.

15. The computer program product of claim 11, wherein the server computational device updates the client side deduplication cache from a server catalog with chunks to increase cache hit ratio, in response to the cache hit ratio in the client side deduplication cache being less than a threshold.

16. A server computational device coupled to one or more client computational devices, comprising,
   a server side repository; and
   a processor coupled to the server side repository, wherein the processor performs operations, the operations comprising:
   maintaining commonly occurring duplicate chunks of deduplicated data that have already been stored in a server side repository via the one or more client computational devices; and
   providing, by the server computational device, a client computational device of the one or more computational devices, with selected elements of the commonly occurring duplicate chunks of deduplicated data, in response to receiving a request by the server computational device from the client computational device to prepopulate, refresh or update a client side deduplication cache maintained in the client computational device, the operations further comprising:
   receiving, by the server computational device, a request to prepopulate the client side deduplication cache of the client computational device;
   determining, by the server computational device, whether a priming client corresponding the client computational device exists, wherein the priming client and the client computational device both have a same version of an operating system, and wherein the priming client and the client computational device are both configured to be provided by the server computational device with elements selected from the commonly occurring duplicate chunks of deduplicated data;
   in response to determining that a priming client corresponding to the client computational device exists, sending, the client computational device, information on chunks stored by the priming client to prepopulate the client side deduplication cache; and
   in response to determining that a priming client corresponding to the client computational device does not exist, sending the client computational device, information on chunks stored by the client computational device in a previous backup to the server computational device by the client computational device.

17. The server computational device of claim 16, the operations further comprising:
   maintaining information about reference counts of the chunks;
   maintaining information about dates and times when the chunks were stored in the server side repository; and
   maintaining information about type of data the chunks represent and whether the chunks are based on a single client system, a group of similar client systems, or comprise an entire catalog of unique chunks.

18. The server computational device of claim 16, the operations further comprising:
   receiving a request to refresh the client side deduplication cache that is invalid;
   in response to determining that the client computational device has stored chunks on the server computational device in a previous backup, sending the client computational device, information on the chunks stored by the client computational device in the previous backup; and
   in response to determining that the client computational device has not stored chunks on the server computational device in a previous backup, sending the client computational device, information on the chunks stored by a priming client corresponding to the client computational device.

19. The server computational device of claim 16, wherein the server computational device provides information to the client computational device that potentially increases a cache hit ratio of the client side deduplication cache in the client computational device.

20. The server computational device of claim 16, wherein the server computational device updates the client side deduplication cache from a server catalog with chunks to increase cache hit ratio, in response to the cache hit ratio in the client side deduplication cache being less than a threshold.

* * * * *